United States Patent
Glowacki et al.

(10) Patent No.: US 6,279,221 B1
(45) Date of Patent: Aug. 28, 2001

(54) VEHICLE DRIVESHAFT

(75) Inventors: Maciej Glowacki, West Bloomfield; Walter Joseph Golembiewski, Ray, both of MI (US)

(73) Assignee: Visteon Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/392,148

(22) Filed: Sep. 8, 1999

(51) Int. Cl.⁷ .................................................. B23P 17/00
(52) U.S. Cl. ........................ 29/527.2; 29/428; 403/359.6
(58) Field of Search ........................ 29/428, 525, 897.2, 29/527.2; 403/359.1, 359.6; 464/180, 183; 72/370.2, 370.24

(56) References Cited

U.S. PATENT DOCUMENTS

| | | | |
|---|---|---|---|
| Re. 20,270 | * 2/1937 | Matthews et al. | 464/179 |
| 1,779,805 | * 10/1930 | Dunwoodie | 403/359.6 |
| 2,015,430 | * 9/1935 | Matthews et al. | 464/179 |
| 3,024,626 | 3/1962 | Frischman . | |
| 3,367,142 | 2/1968 | Groves et al. . | |
| 3,891,519 | 6/1975 | Grellet . | |
| 4,552,544 | 11/1985 | Beckman et al. . | |
| 4,909,361 | * 3/1990 | Stark et al. | 188/268 |
| 4,915,536 | * 4/1990 | Bear et al. | 403/267 |
| 5,309,620 | * 5/1994 | Shinohara et al. | 29/432 |
| 5,628,688 | * 5/1997 | Eversole et al. | 464/162 |
| 5,634,853 | * 6/1997 | Smith | 464/162 |
| 5,716,276 | * 2/1998 | Mangas et al. | 464/16 |
| 5,720,102 | 2/1998 | McClanahan . | |
| 5,836,823 | * 11/1998 | Shellaberger | 464/134 |
| 5,851,152 | * 12/1998 | Ilzhofer et al. | 464/181 |
| 5,868,627 | * 2/1999 | Stark et al. | 464/180 |
| 5,924,531 | * 7/1999 | Stark et al. | 188/372 |
| 5,930,908 | * 6/1999 | Patrisso et al. | 33/600 |
| 5,951,402 | * 9/1999 | Baldwin et al. | 464/162 |
| 5,961,388 | * 10/1999 | Breidenbach et al. | 464/133 |
| 5,976,021 | * 11/1999 | Stark et al. | 464/180 |
| 6,003,238 | * 12/1999 | Aiken et al. | 33/600 |

* cited by examiner

*Primary Examiner*—S. Thomas Hughes
*Assistant Examiner*—Essama Omgba
(74) *Attorney, Agent, or Firm*—Visteon Global Tech., Inc.

(57) ABSTRACT

A vehicle driveshaft 10 having first and second splined members 12,16 which are manufactured of aluminum, which are anodized, and which respectively include relatively long and wide respective spline portions 14, 18, thereby cooperatively forming a relatively stiff driveshaft 10.

9 Claims, 2 Drawing Sheets

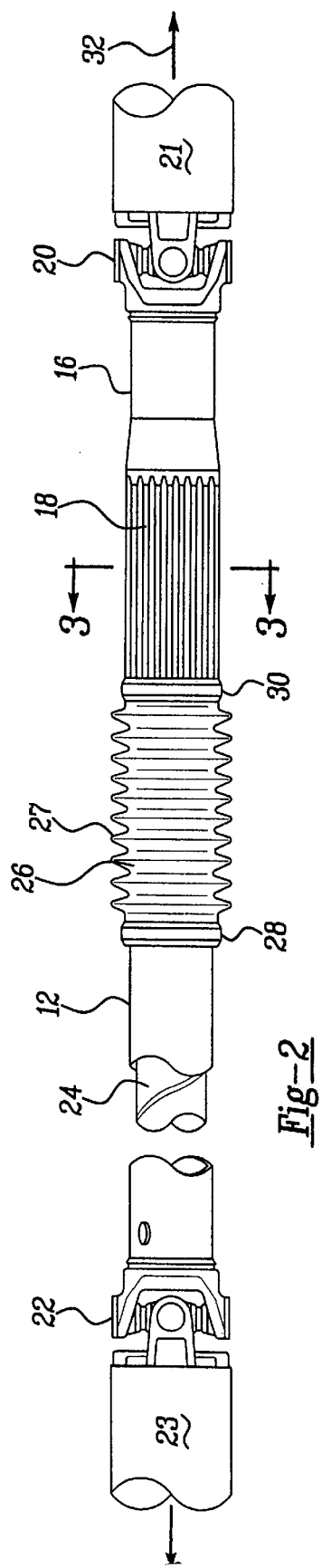
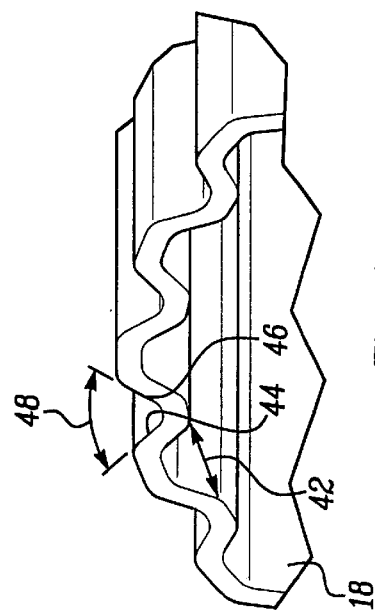
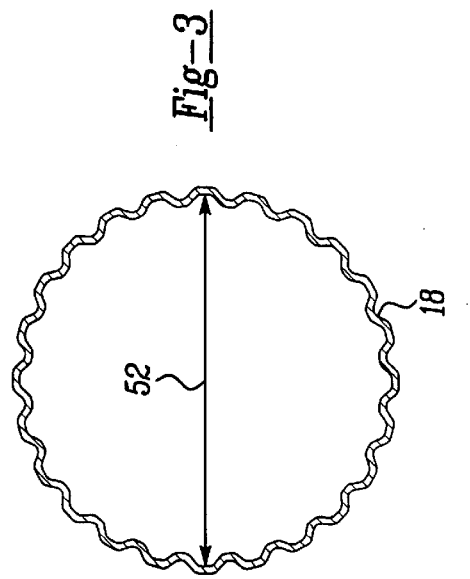

VEHICLE DRIVESHAFT

(1) FIELD OF THE INVENTION

This invention relates to a vehicle driveshaft and more particularly, to a relatively stiff vehicle driveshaft which is relatively light in weight and which includes relatively long splined portions having relatively large and/or wide spline pitch diameters and working areas.

(2) BACKGROUND OF THE INVENTION

A vehicle driveshaft is typically and operatively mounted to a transmission assembly and to a differential assembly and, more particularly, transfers the transmission produced torque to the differential, thereby causing the vehicle wheels to be desirably and selectively turned. The driveshaft also dynamically compensates for the change or modification in the distance between the transmission and the differential which occurs as the vehicle is driven. Hence, the driveshaft includes a portion or a member which typically and telescopingly moves along the longitudinal axis of the driveshaft in response to relative movement between the differential and the transmission (e.g., the driveshaft is capable of dynamically modifying its length in response to the movement of the vehicle).

This dynamic length modification is typically achieved by the use of a pair of splined members which are normally manufactured of a relatively heavy material, such as conventional and commercially available iron, and which are respectively and commonly referred to as the "slip yoke" and the "yoke shaft". Particularly, the yoke shaft member is selectively inserted into the slip yoke and is movably coupled to the transmission. The slip yoke is typically coupled to the differential and the respective splines of these members (which are typically broached or "machined" onto the yoke members) intermeshingly cooperate to allow and/or to cause the yoke shaft to rotate the slip yoke in response to the rotation of the transmission, thereby allowing the transmission produced torque to be selectively coupled to the differential by the rotation of the slip yoke. The intermeshed splines also allow the yoke shaft to be movable along the longitudinal axis of the driveshaft, thereby allowing the driveshaft to dynamically compensate for changes in the distance between the transmission and the differential and allowing the driveshaft to desirably operate as the vehicle is driven. While these driveshafts allow for the desired communication of the transmission-produced torque to the differential, they suffer from some drawbacks.

First, the yoke members of these prior driveshafts are normally and rather loosely connected because the respective splines are typically formed on only relatively small or relatively short portions of the respective and relatively heavy yoke members. These relatively short intermeshing splined portions allow the engaged members to undesirably "wobble" as the vehicle is driven and produce undesirable noise and vibrations which are undesirably communicated into the passenger compartment. These relatively short "yoke engagement" portions also cause undesirable "backlash" to occur as the transmission generated torque is transferred to the slip yoke member. Secondly, the relatively heavy yoke members require relatively narrowly formed and narrowly spaced splines which cause the engaged members to experience relatively high stress are loads and which further cause undesirable fatigue and/or failure of the splines and/or of the engaged yoke members. Additionally, the relatively heavy material used to form the yoke members requires the yoke members to have a relatively small diameter to avoid the undesirable addition of weight to the vehicle. These relatively small diameter members further cooperatively provided only a relatively limited or small amount of engaging surface or "working" area between the intermeshing yoke members, thereby further causing relatively high stress and loads to be applied and/or transferred among and between the engaged members. Finally, the engaged yoke members are prone to undesirably "buckle" during and/or as a result of a vehicle accident, thereby undesirably damaging many of the vehicle underbody components, including but not limited to, the vehicle fuel tank.

There is therefore a need for (a new and improved vehicle driveshaft which overcomes many, if not all, of the previously delineated drawbacks of such prior vehicle driveshafts.

SUMMARY OF THE INVENTION

It is a first object of the invention to provide a vehicle driveshaft which overcomes at least some of the previously delineated drawbacks of prior vehicle driveshafts.

It is a second object of the invention to provide a relatively lightweight vehicle driveshaft having a pair of selectively hardened, engaging, and intermeshing splined members which cooperatively allow for the formation of a relatively stiff vehicle driveshaft.

It is a third object of the invention to provide a vehicle driveshaft having a pair of selectively engaging and intermeshing splined members, each of the splined members respectively containing relatively long and relatively widely spaced splines which form and/or which contain relatively wide or large "pitch diameters" and/or "working areas".

It is a fourth object of the invention to provide a vehicle driveshaft having a pair of selectively engaging and intermeshing splined members which are respectively engaged and/or are operatively coupled along a relatively long engagement and/or coupling distance.

It is a fifth object of the invention to provide a vehicle driveshaft having a pair of intermeshing splined members having a respective and a relatively large diameter.

According to a first aspect of the present invention, a vehicle driveshaft is provided and includes a pair of aluminum members, each of the aluminum members being of a certain respective length and having a certain respective diameter of a certain respective value. Each of the pair of aluminum members has a respective splined portion which has a respective length equal to about three times the value of one of the respective diameters and the respective splined portions intermeshingly cooperate to form a relatively stiff vehicle driveshaft.

According to a second aspect of the present invention, a method is provided to increase the stiffness of a driveshaft of the type having a first member, and a second member which movably extends a certain length within the first member. The method includes the steps of increasing the certain length.

According to a third aspect of the present invention, a vehicle driveshaft is provided and is formed by the process of providing a first and a second aluminum member; forming splines within the first and the second aluminum members; coating the formed splines with a hard anodized coating; and placing the first member into the second member, thereby cooperatively forming a driveshaft by the use of the first and the second members.

These and other features, aspects, and advantages of the invention will become apparent by reading the following specification and by reference to the following drawings.

BRIEF DESCRIPTION OF THE DRAWINGS

FIG. 2 is assembled side view of the driveshaft which is shown in FIG. 1; and

FIG. 3 is a side view of the driveshaft taken along view line 3—3;

FIG. 4 is a fragmented perspective view of the portion of the driveshaft which is shown in FIG. 3 and which illustrates portions of the splines which are used and/or selectively formed upon the vehicle driveshaft of the preferred embodiment of the invention.

DETAILED DESCRIPTION OF THE PREFERRED EMBODIMENT

Figure 1:
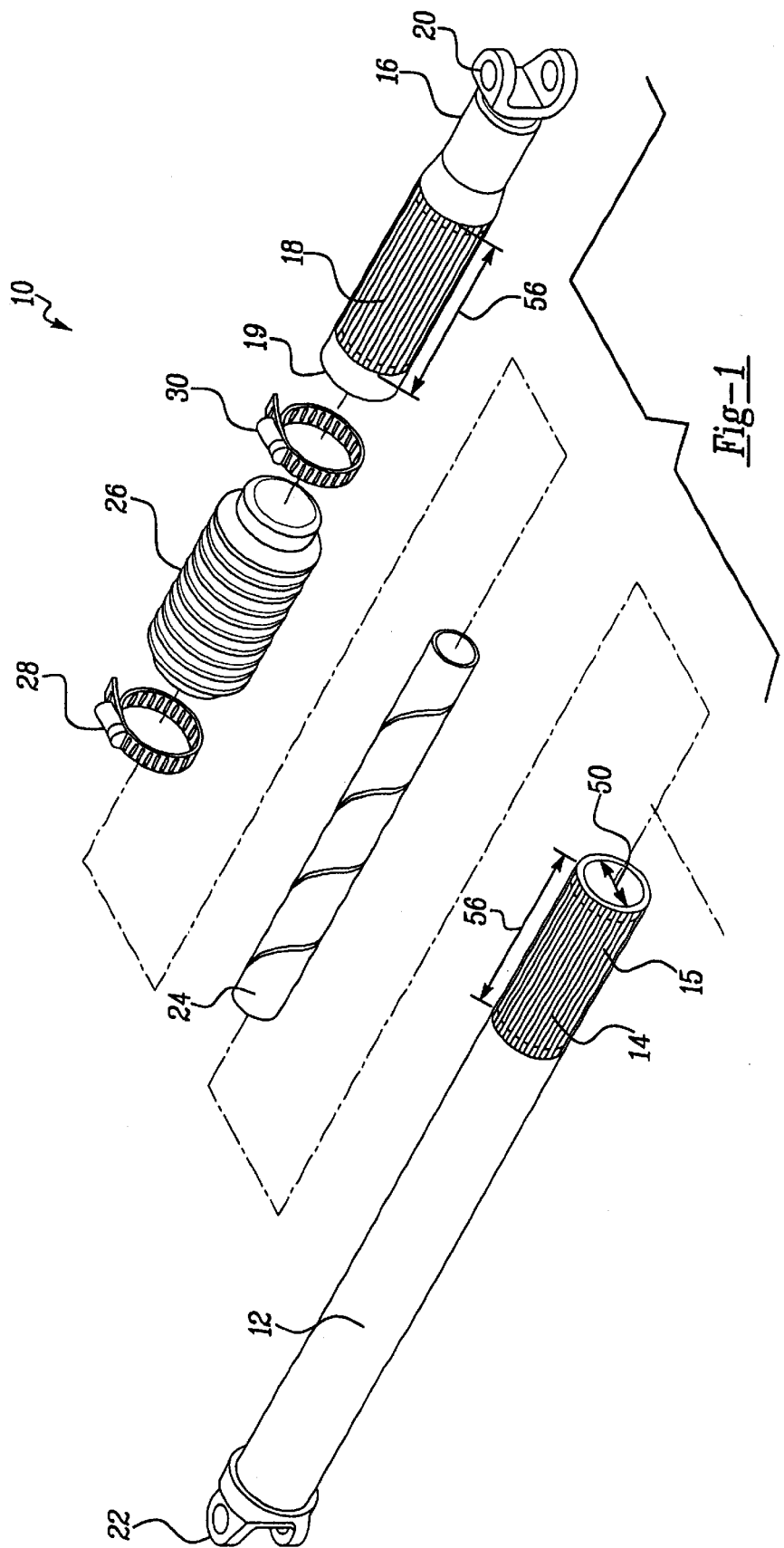
FIG. 1 is an unassembled perspective view of a vehicle driveshaft which is made in accordance with the teachings of the preferred embodiment of the invention.

Referring now to FIGS. 1 through 4, there is shown a driveshaft 10 which is made in accordance with the teachings of the preferred embodiment of the invention. As shown, driveshaft 10 includes a generally round and/or tubular and generally hollow member 12 having a splined portion 14 which is circumferentially formed upon the exterior surface 15 of member 12. Driveshaft 10 further includes a second generally round and/or tubular and generally hollow member 16 having a splined portion 18 which is circumferentially formed upon the inner surface 19 of member 16 and which is adapted to selectively and cooperatively intermesh with a splined portion 14. Members 12, 16 have relatively large respective diameters 50, 52 which in one non-limiting embodiment are respectively equal to about approximately four (4.0) inches to about four and one-half (4.5) inches. Other larger diameter values may be utilized according to the teachings of this invention.

Member 12 is adapted to selectively, movably, and telescopingly penetrate member 16 and to allow splined portions 14, 18 to cooperatively intermesh in the usual and known manner. Particularly, as shown, member 16 is movably coupled, by the use of a conventional flange 20, to a conventional transmission 21, while member 12 is movably coupled, by the use of a conventional flange 22, to a conventional differential 23. The torque, supplied by the transmission 21 is communicated to member 16 and then, by use of the intermeshed spline portions 14, 18, to member 16 and to the differential 23.

As further shown, driveshaft 10 includes a substantially round and generally tubular shaped vibration dampening member 24, which is adapted to conform to the shape of the selectively and movably engaged members 12, 16 and which is removably and selectively placed within the assembled members 12, 16. Particularly, member 24 absorbs at least some of the vibrational energy which is generated by the operatively assembled members 12, 16. Member 24 may be formed from conventional and commercially available cardboard and/or from a variety of other vibration dampening materials.

In one non-limiting embodiment of the invention, a rubber boot member 26 having several integrally formed and selectively expandable pleats 27 substantially covers the intermeshed portions 14 and 18 and is clamped onto the driveshaft 10 by the use of a pair of substantially identical and commercially available generally circular clamps 28, 30. In one embodiment, the boot member 26 selectively "slips" or "slides" over the splined portions 14, 18 in the manner shown. The cooperating spline portions 14, 18 also allow member 12 to dynamically move along the longitudinal axis of symmetry 32 of the driveshaft 10 in response to changes in the distance between the transmission 21 and the differential 23, in a known manner.

In the preferred embodiment of the invention, the members 12 and 16 are manufactured from conventional and commercially available lightweight aluminum material which may comprise a commercially available "6061-T4" type of aluminum or aluminum alloy material. The splines are "cold formed" upon the portions 14, 18 by the use of the conventional "Grob" process which is provided by the Grob Corporation of Mannedorf, Switzerland. Moreover, splined portions 14, 18 are selectively hardened or "anodized" in accordance with the commercially available Metalast anodizing process which is provided by the Metalast corporation of Minden, Nev. More particularly, the splined portions 14, 18, in one non-limiting embodiment, are anodized with a layer of "Metalast hardcoat" material having a thickness of about 0.002".

Importantly, the use of such anodized aluminum and cold-formed spline portions 14, 18 allows for a relatively light-weight driveshaft 10 which substantially reduces the amount of vibration and noise which emanates from the operatively formed driveshaft 10. The relatively lightweight aluminum construction allows members 12, 16 to have relatively large diameters 50, 52, while providing a significant decrease in the overall weight relative to prior driveshafts. These relatively large diameter members 50, 52 efficiently distribute the applied axial loads over a larger surface area, thereby allowing driveshaft 10 to support relatively larger torques at relatively higher speeds than prior driveshaft assemblies. Further, this relatively lightweight design allows for relatively long spline portions 14, 18 which, in the preferred embodiment, each have a substantially identical length 56 equal to at least and approximately three times the diameter 52 of member 16 (e.g., approximately 13.5 inches). In other alternate non-limiting embodiments, splines 14, 18 have lengths which respectively extends approximately half way along members 12, 16 or have respective lengths equal to approximately three times their respective diameter. The anodized aluminum splines also, as is best shown in FIG. 3 and 4, allow for a relatively large and/or wide splined mating surfaces and/or "working areas" (e.g., which in one non-limiting embodiment have a "pitch diameter" 42 equal to about ten to about twenty millimeters). These wide splines allow for better distribution of the axial loads imparted upon portions 14, 18 effective to reduce the overall wear of the splines and the "working" or "operating" life of the driveshaft 10.

In one non-limiting, embodiment, each end wall 44, 46 of each spline cooperatively forms an angle 48 of about sixty degrees (60°), although other angular configurations may be utilized. Further, while a portion of the splined portion 18 is shown in FIG. 3, it should be realized that splined portion 14 is substantially similar to that which is shown in FIG. 3. Further, it should be appreciated that these relatively long intermeshing portions 14, 18 reduce the amount of noise and/or vibrations which are generated from the driveshaft 10, and these relatively long splined portions 14, 18 reduce the probability that the driveshaft 10 will undesirably buckle in a collision, thereby increasing the overall safety of the vehicle. Further, these relatively lightweight members 12, 16 having relatively long respective splined portions 14, 18 allow for the creation of a relative stiff and lightweight driveshaft which, in one embodiment, may replace and/or substantially shorten the elongated transmission extension member 21.

It is to be understood that the invention is not to be limited to the exact construction and/or method which has been illustrated and discussed above, but that various changes and/or modifications may be made without departing from the spirit and the scope of the invention.

What is claimed is:

1. A method for forming a driveshaft having increased stiffness, said method comprising the steps of:

forming a first splined member from a relatively lightweight aluminum material, said first splined member being formed having a relatively wide first diameter of a certain value and a first splined portion having a length of about three times said certain value;

forming a second splined member which movably extends a certain length within the first splined member, said second splined member being formed from a relatively lightweight aluminum material, and having a second splined portion with a length of about three times said certain value; and hardening said first and said second splined portions.

2. The method of claim 1 wherein the splines on said first and second members are formed having relatively wide mating surfaces.

3. The method of claim 2 wherein said splines are formed having a pitch diameter of about ten to twenty millimeters.

4. The method of claim 1 wherein said first and said second splined portions are formed by use of a cold forming process.

5. The method of claim 4 further comprising the steps of providing a rubber boot member; and placing said rubber boot member over said first and said second splined members.

6. The method of claim 5 further comprising the steps of providing a dampening member; and placing said dampening member into said first and said second splined member.

7. The method of claim 6 wherein said dampening member comprises cardboard.

8. The method of claim 4 wherein said hardening of said first and said second splined portions is performed by use of an anodizing process.

9. The method of claim 8 wherein said first and said second splined portions are anodized with a hardening material having a thickness of about 0.002 inches.

* * * * *